(12) United States Patent
Lin et al.

(10) Patent No.: US 10,261,225 B2
(45) Date of Patent: Apr. 16, 2019

(54) FILTER ASSEMBLY AND CAMERA MODULE HAVING THE SAME

(71) Applicants: LITE-ON ELECTRONICS (GUANGZHOU) LIMITED, Guangzhou (CN); LITE-ON TECHNOLOGY CORP., Taipei (TW)

(72) Inventors: Chun-Lung Lin, Taipei (TW); Gaowei Xie, Taipei (TW); Haichao Du, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 35 days.

(21) Appl. No.: 15/409,608

(22) Filed: Jan. 19, 2017

(65) Prior Publication Data

US 2018/0095204 A1   Apr. 5, 2018

(30) Foreign Application Priority Data

Sep. 30, 2016   (CN) .......................... 2016 1 0878695

(51) Int. Cl.
| | |
|---|---|
| *G02B 5/00* | (2006.01) |
| *G02B 5/22* | (2006.01) |
| *G03B 11/00* | (2006.01) |
| *H04N 5/225* | (2006.01) |

(52) U.S. Cl.
CPC .............. *G02B 5/22* (2013.01); *G02B 5/003* (2013.01); *G03B 11/00* (2013.01); *H04N 5/2254* (2013.01)

(58) Field of Classification Search
CPC .......... G02B 13/04; G02B 13/06; G02B 5/20; G02B 13/00; G02B 27/0025; G02B 9/34; G02B 13/004; G02B 15/173; G02B 1/043; G02B 27/46; G02B 5/205; G02B 7/102; G02B 13/16; G02B 13/18; G02B 13/24; G02B 15/14; G02B 15/177; G02B 17/085
USPC ......... 359/723, 722, 738, 740, 885, 891, 15, 359/889, 589, 726, 590, 683, 724, 737
See application file for complete search history.

(56) References Cited

U.S. PATENT DOCUMENTS

| | | | | |
|---|---|---|---|---|
| 2007/0064317 A1* | 3/2007 | Chen | .................... | H04N 5/2253 359/811 |
| 2010/0325825 A1* | 12/2010 | Kawai | ................ | G02B 27/0006 15/94 |
| 2012/0211852 A1* | 8/2012 | Iwafuchi | ........... | H01L 27/14618 257/435 |

* cited by examiner

*Primary Examiner* — Thomas K Pham
*Assistant Examiner* — Sharrief I Broome
(74) *Attorney, Agent, or Firm* — Rosenberg, Klein & Lee

(57) ABSTRACT

A filter assembly includes a filter defining a light transmissive region for light of a specific wavelength range to pass therethrough, and a non-light transmissive first sheet body preformed and adhered to a surface of the filter. The first sheet body has a first opening with a shape conforming to that of the light transmissive region.

12 Claims, 4 Drawing Sheets

FILTER ASSEMBLY AND CAMERA MODULE HAVING THE SAME

CROSS REFERENCE TO RELATED APPLICATION

This application claims priority of Chinese Patent Application Number 201610878695.2, filed on Sep. 30, 2016.

FIELD

The disclosure relates to a camera module, more particularly to a filter assembly having a function of shielding the lens from stray light and a camera module having the filter assembly.

BACKGROUND

Nowadays, smart phones, tablet computers or other portable electronic devices are mostly equipped with miniature camera modules for a user to take pictures or photographs. The main components of the camera module employed in the portable electronic device includes a lens for focusing light, and an image sensor. When taking a picture, light reflected by an object will pass through the lens and is focused on the image sensor. The image sensor, in turn, will convert an optical signal into an electrical signal that is operable to become a digital image.

To prevent the image sensor from being affected by infrared rays or the like which will lower the quality of the digital image, a filter mounted on a frame is usually disposed between the lens and the image sensor to block passage of, for example, the infrared rays. To avoid the frame from blocking the focused light, and in consideration of the component tolerances and assembly errors, the area of the filter must be greater than an effective light sensing area (light imaging area) of the image sensor.

Under some circumstances, peripheral components of the image sensor, such as gold wire for chip mounting and wire bonding, etc., will reflect the light entering an interior of the camera module to a surface of the lens which is proximate to the image sensor, and then the light is focused on the image sensor, thereby causing the quality of the digital image to lower. The light reflected in the interior of the camera module is called flare. To resolve the problem of lowering the image quality caused by the flare, an anti-reflection film layer is usually coated on a surface of the lens to reduce formation of the flare, or a black ink layer is printed on a region of the filter by an oil printing method to shield the flare.

However, the technical barrier and the cost of providing blank ink layer on the filter are high and are not easy for later adjustment and correction. Hence, there is still room for improving the conventional filter.

SUMMARY

Therefore, an object of the present disclosure is to provide a filter assembly that can shield the flare in an interior of a camera module.

Another object of this disclosure is to provide a camera module having a filter assembly that can shield the flare in an interior of the camera module.

According to one aspect of this disclosure, a filter assembly comprises a filter defining a light transmissive region for light of a specific wavelength range to pass therethrough, and a non-light transmissive first sheet body preformed and adhered to a surface of the filter. The first sheet body has a first opening with a shape conforming to that of the light transmissive region.

According to another aspect of this disclosure, a camera module comprises a base, a carrier frame, an image sensor, a filter assembly, a hollow casing and a lens. The carrier frame is disposed on the base and includes a surrounding wall extending upward from the base, and a top wall extending inward from a top periphery of the surrounding wall and defining an opening. The surrounding wall, the top wall and the base cooperate with each other to define a receiving space communicating with the opening. The image sensor is disposed on the base and is received in the receiving space. The filter assembly includes a filter and a non-light transmissive first sheet body. The filter is fixed to the top wall, covers the opening, and defines a light transmissive region for light of a specific wavelength range to pass therethrough. The first sheet body is preformed and adhered to a surface of the filter. The first sheet body has a first opening with a shape conforming to that of the light transmissive region. The hollow casing is disposed on and supported by the top wall. The lens is received in an interior space of the hollow casing.

This disclosure has at least the following effects: The first sheet body has the function of shielding flare, and is fixed to the filter by first being preformed and then adhered to a surface of the filter. In comparison with the conventional method of coating a black ink layer, apart from being simple in assembly and having a low cost, the present disclosure can also facilitate adjustment of the size or position of the light transmissive region.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
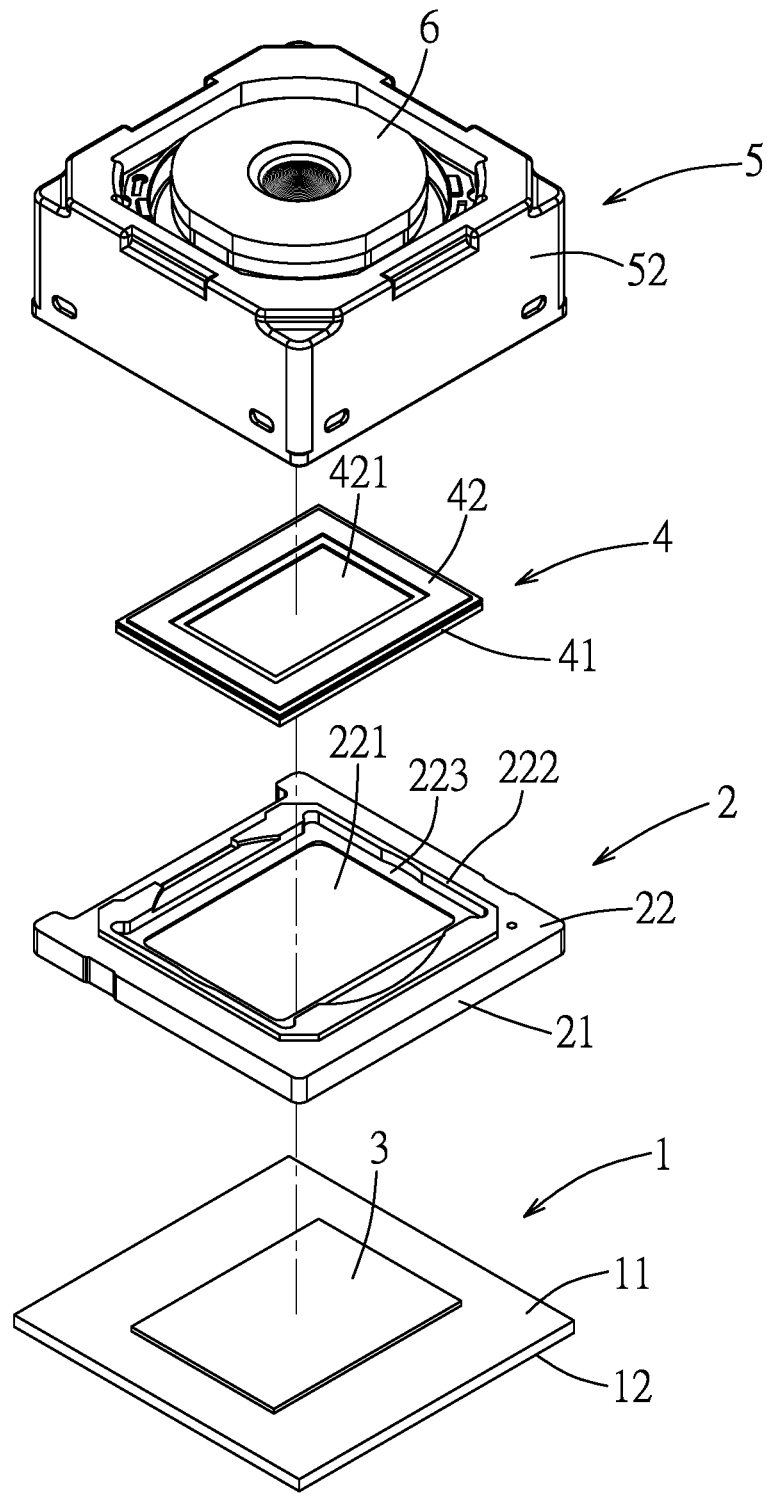
FIG. 1 is an exploded perspective view of a camera module according to the first embodiment of the present disclosure.

Before the present disclosure is described in greater detail with reference to the accompanying embodiments, it should be noted herein that like elements are denoted by the same reference numerals throughout the disclosure.

Figure 2:
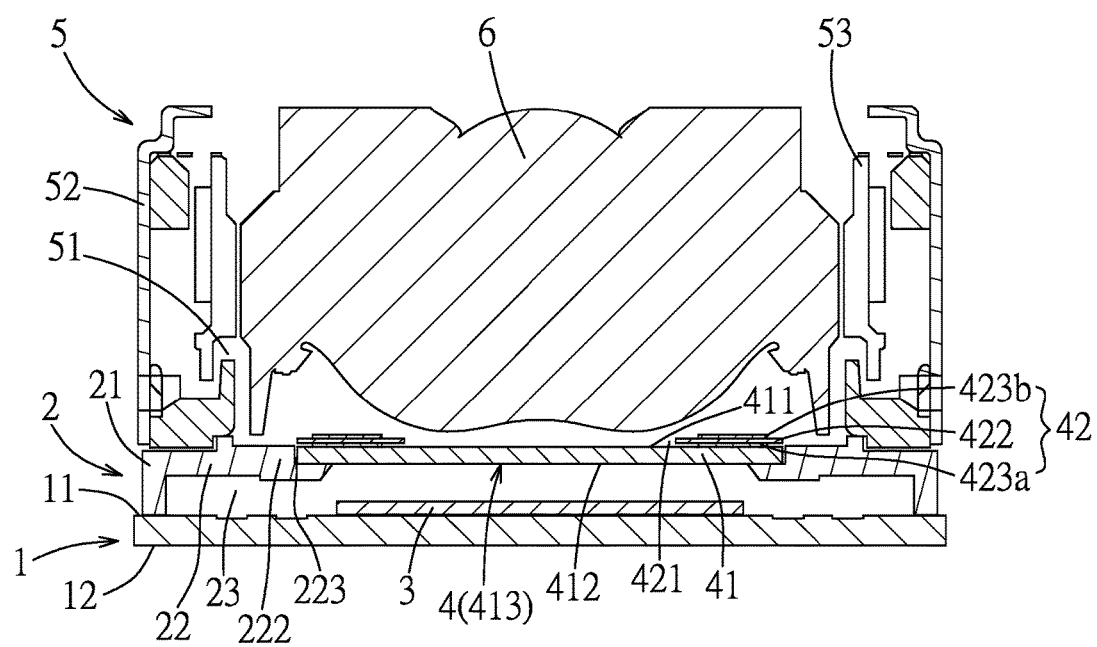
FIG. 2 is an assembled sectional view of the first embodiment.

Referring to FIGS. 1 and 2, a camera module according to the first embodiment of the present disclosure is shown to include a base 1, a carrier frame 2, an image sensor 3, a filter assembly 4, a housing 5, and a lens 6. The base 1 is a printed circuit board, and has opposite upper and lower surfaces 11, 12. The carrier frame 2 is fixed on the upper surface 11 of the base 1 by an adhering method, and includes a surrounding wall 21 extending upward from the upper surface 11, and a top wall 22 extending inward from a top periphery of the surrounding wall 21 and defining an opening 221 at a central portion thereof. The top wall 22 has an annular stepped portion 222 formed adjacent to the opening 221. The stepped portion 222 defines an annular placement groove 223 communicating with the opening 221. The base 1 cooperates with the surrounding and top walls 21, 22 to define a receiving space 23 communicating with the opening 221. The image sensor 3 is disposed on the upper surface 11 of the base 1 and is received in the receiving space 23 for converting an optical image into an electronic signal of a charge-coupled device (CCD) or an active pixel sensor (CMOS).

The filter assembly 4 is fixed to the stepped portion 222 using an adhering method, for example, by dispensing glue on the stepped portion 222 so that the filter assembly 4 may be fixed to the carrier frame 2. The filter assembly 4 includes a filter 41 and a non-light transmissive first sheet body 42 adhered to the filter 41. In this embodiment, the first sheet body 42 is an opaque sheet body. The filter 41 can permit visible light to pass through so as to form a visible light image on the image sensor 3. In other embodiments, other specific wavelength range of light may be selected according to the different requirements to pass through the filter 41. The filter 41 is fixed on the top wall 22, covers the opening 221, and is accommodated in the placement groove 223.

The filter 41 has a first surface 411 facing away from the base 1, and a second surface 412 opposite to the first surface 411. The non-light transmissive first sheet body 42 includes a first light shielding sheet 422 having a first central opening 421, and a first adhesive layer (423a) adhering the first light shielding sheet 422 to the filter 41. Specifically, the first sheet body 42 is first preformed and then adhered to the first surface 411 of the filter 41. The filter 41 defines a light transmissive region 413 for light to pass therethrough and having a shape conforming to that of the first central opening 421. The region of the filter 41 other than the light transmissive region 413 is blocked by the first light shielding sheet 422 so that the flare will not pass through the filter 41 and interfere the image processing of the image sensor 3.

In this embodiment, the first sheet body 42 is first preformed, after which it is adhered to the filter 41 to make the filter assembly 4. In comparison with the conventional method of coating a black ink layer, apart from being simple in assembly and having a low cost, it is also easy to adjust the size or position of the light transmissive region 413 of the present disclosure. Since different camera modules may have different lens optical systems, the size or position of the first sheet body 42 of this embodiment is simply adjusted to suit different optical systems, so that there is no need to specially fabricate the filter 41 to suit the different optical systems. The order of assembly of this embodiment is to assemble the filter assembly 4 first, after which the filter assembly 4 is fixed to the stepped portion 222 of the top wall 22 of the carrier frame 2.

In this embodiment, the first light shielding sheet 422 is a Mylar sheet. However, other opaque polymer material may be selected according to the manufacturing process. Further, in other embodiments, the first sheet body 42 may be an opaque double-sided adhesive tape that is directly adhered to the filter 41 and that has the first central opening 421.

The housing 5 is fixed to the top wall 22 of the carrier frame 2, for example, by an adhering method so as to be supported by the same. Since an auto focus camera module is exemplified in this disclosure, the housing 5 includes a hollow casing 52 defining an interior space 51, and a voice coil motor (VCM) 53 disposed in the interior space 51. In this case, the housing 5 is a lens position moving device.

The lens 6 is received in the interior space 51 of the casing 52. When the lens 6 is fastened to the voice coil motor 53 or when the auto focus function (AF) of the voice coil motor 53 is activated, dust or debris is generated due to friction among the components. If the dust falls onto the filter 41, it will appear in the image, thereby affecting the image quality of the camera module. In this respect, the first sheet body 42 of this embodiment further includes a second adhesive layer (423b) disposed on the first light shielding sheet 422 facing away from the first surface 411 of the filter 41, so that a surface of the first sheet body 42 facing away from the first surface 411 is sticky and can catch fine dust generated from the voice coil motor 53 entering the interior space 51 of the casing 52. Thus, the image sensor 3 can be prevented from being indirectly affected by the fine dust. The present disclosure may also be applied to a fixed focus camera module, that is, the housing 5 only includes the casing 52 (that is, a lens seat) for fixing the lens 6. In this case, the housing 5 is a lens position fixing device, and the adhesive layer (423b) can catch the fine dust generated due to friction among components when the lens 6 is fastened to the casing 52.

Figure 3:
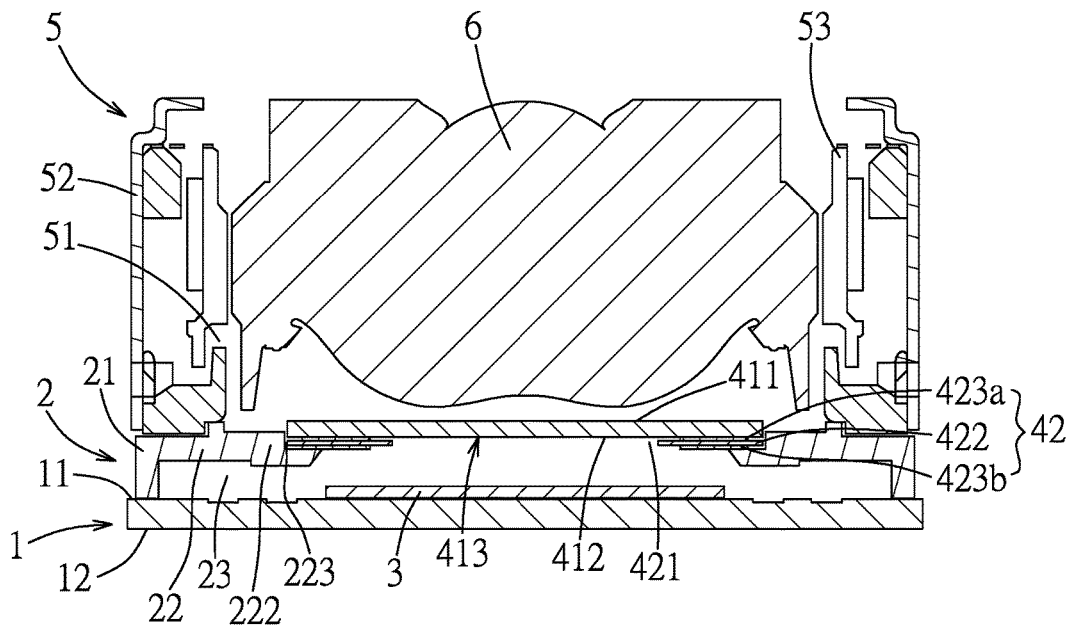
FIG. 3 is an assembled sectional view of a camera module according to the second embodiment of the present disclosure.

Referring to FIG. 3, the second embodiment of the camera module according to the present disclosure is shown to be identical to the first embodiment. However, in this embodiment, the non-light transmissive first sheet body 42 is disposed on the second surface 412 of the filter 41. The order of assembly of this embodiment is also similar to that of the first embodiment. That is, after the filter assembly 4 is assembled, it is fixed to the stepped portion 222 of the top wall 22 of the carrier frame 2, for example, by glue dispensing. The second adhesive layer (423b) of this embodiment can catch the fine dust existing in the receiving space 23 defined by the base 1 and the carrier frame 2.

Figure 4:
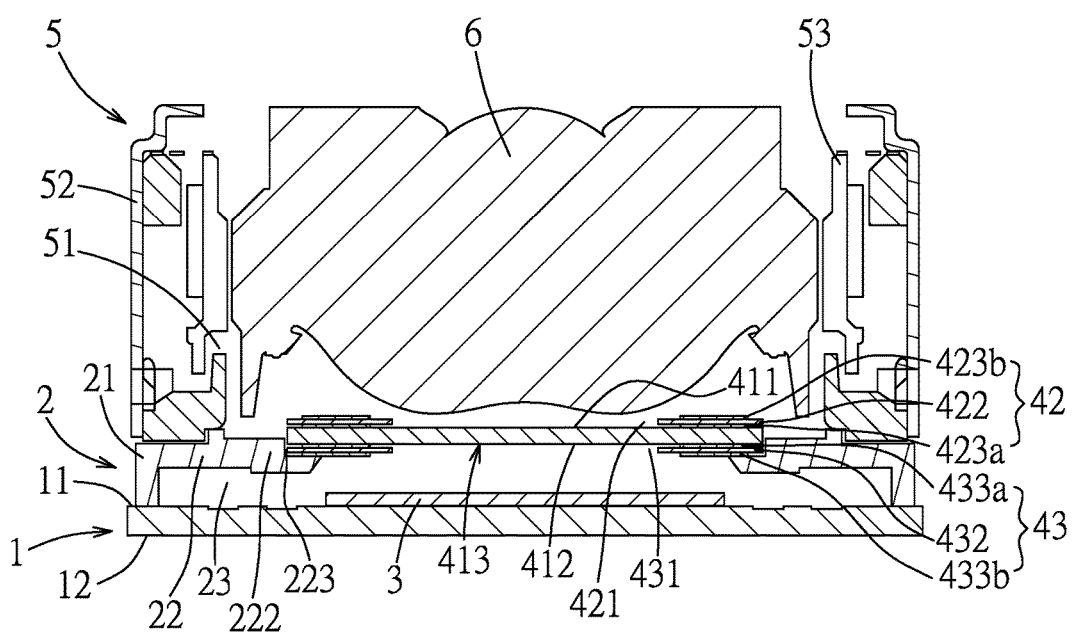
FIG. 4 is an assembled sectional view of a camera module according to the third embodiment of the present disclosure.

Referring to FIG. 4, the third embodiment of the camera module according to the present disclosure is shown to be identical to the first embodiment. However, in this embodiment, the filter assembly 4 further includes a second sheet body 43 that is opaque and that does not cover the light transmissive region 413 of the filter 41. The second sheet body 43 is disposed on the second surface 412 of the filter 41, and includes a second light shielding sheet 432 having a second central opening 431, and a first adhesive layer (433a) adhering the second light shielding sheet 432 to the second surface 412. The second sheet body 43 is first preformed and then adhered to the second surface 412 of the filter 41. In this embodiment, the second light shielding sheet 432 is a Mylar sheet. However, other opaque polymer material may be selected according to the manufacturing process. Further, in other embodiments, the second sheet body 43 may be an opaque or a light-transmissive double-sided adhesive tape that is directly adhered to the filter 41 and that has the second central opening 431. Although the second sheet body 43 of this embodiment is opaque, in other embodiments, the second sheet body 43 may permit light to pass therethrough. In the different embodiments of this disclosure, as long as one of the first and second sheet bodies 42, 43 is opaque, then it is acceptable. When the second sheet body 43 is opaque, the light transmissive region 413 is defined by the second central opening 431. Further, each of the first and second sheet bodies 42, 43 may also be black or a known material used to cover infrared rays, the filter 41 is an IR filter, and the image sensor 3 is an IR sensor.

The second sheet body 43 of this embodiment further includes a second adhesive layer (433b) disposed on the second light shielding sheet 432 facing away from the second surface 412 of the filter 41, so that the surface of the second sheet body 43 facing away from the second surface 412 of the filter 41 is sticky and can catch the fine dust existing in the receiving space 23 defined by the base 1 and the carrier frame 2. Further, because the surface of the first sheet body 42 facing away from the first surface 411 of the filter 41 is also sticky (through the second adhesive layer 423*b*), in this embodiment, the first and second sheet bodies 42, 43 can catch the fine dust located in the top and bottom sides of the filter assembly 4 to prevent the image sensor 3 from being directly or indirectly affected by the fine dust. Moreover, the order of assembly of this embodiment is also similar to those of the first and second embodiments. That is, after the filter assembly 4 is assembled, it is fixed to the stepped portion 222 of the top wall 22 of the carrier frame 2.

Figure 5:
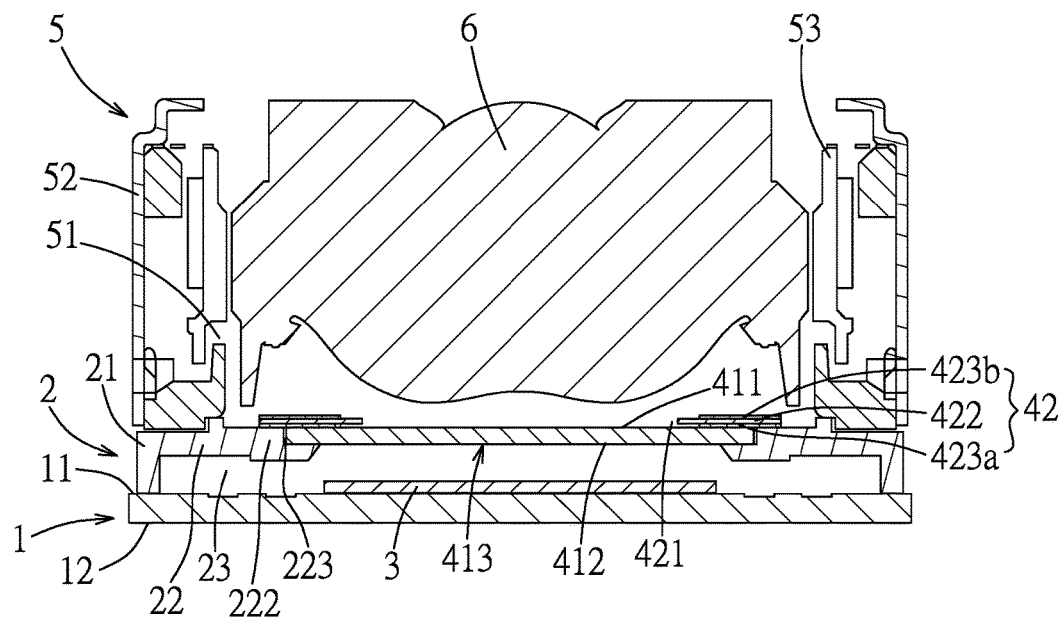
FIG. 5 is an assembled sectional view of a camera module according to the fourth embodiment of the present disclosure.

Referring to FIG. 5, the fourth embodiment of the camera module according to the present disclosure is shown to be identical to the first embodiment. However, in this embodiment, the size of the non-light transmissive first sheet body 42 is larger than that of the first embodiment. The assembly of this embodiment is thus more convenient, in which glue is first dispensed on the stepped portion 222 of the top wall 22 of the carrier frame 2, after which the filter 41 of the filter assembly 4 is placed on the placement groove 223 of the carrier frame 2 so as to adhere the filter 41 on the stepped portion 222. Then, the first sheet body 42 having the first adhesive layer (423*a*) and the second adhesive layer (423*b*) disposed thereon is adhered to the first surface 411 of the filter 41 through the first adhesive layer (423*a*), thereby completing the assembly.

Figure 6:
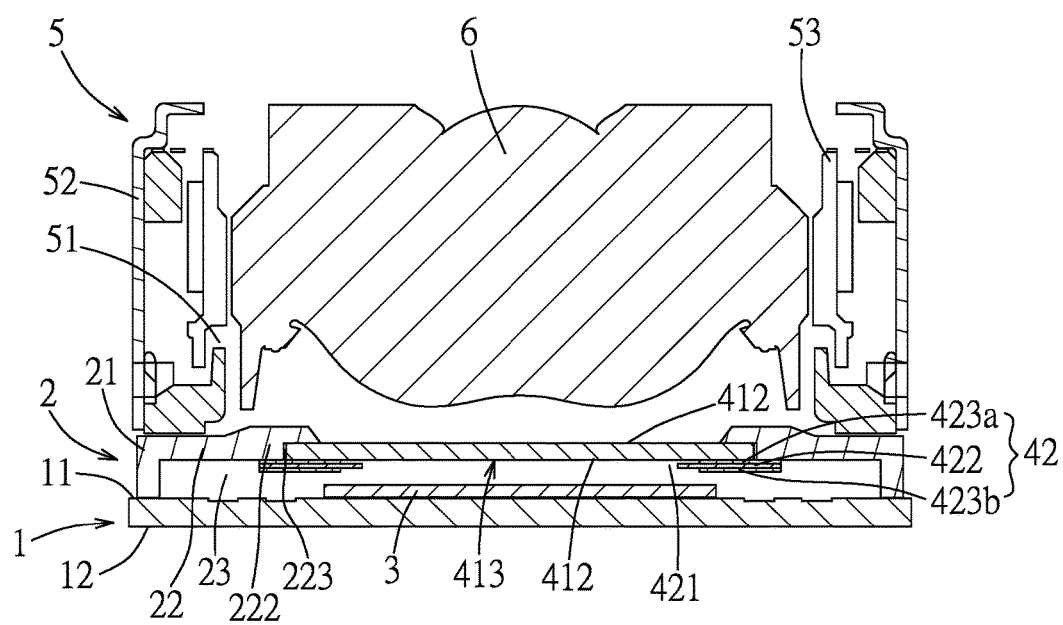
FIG. 6 is an assembled sectional view of a camera module according to the fifth embodiment of the present disclosure.

Referring to FIG. 6, the fifth embodiment of the camera module according to the present disclosure is shown to be identical to the fourth embodiment. However, in this embodiment, the non-light transmissive first sheet body 42 is disposed on the second surface 412 of the filter 41. Further, the formation of the stepped portion 222 of the carrier frame 2 of this embodiment is different from that of the fourth embodiment. The annular placement groove 223 defined by the stepped portion 222 of this embodiment faces the base 1. During assembly, glue is first dispensed on the stepped portion 222, after which the filter 41 of the filter assembly 4 is placed on the placement groove 223 so as to adhere the filter 41 on the stepped portion 222. Then, the first sheet body 42 having the first light shielding sheet 422 on which the first adhesive layer 423*a* and the second adhesive layer 423*b* are disposed is adhered to the second surface 412 of the filter 41 through the first adhesive layer (423*a*). Through the aforesaid steps, the filter assembly 4 can be fixed to the carrier frame 2, and the assembly of the carrier frame 2 and the filter assembly 4 is then fixed to the base 1.

In sum, the non-light transmissive first sheet body 42 of the camera module of this disclosure has the function of shielding flare, and is fixed to the filter 41 by first being preformed and then adhered to the filter 41. In comparison with the conventional method of partially coating a black ink layer on the filter, apart from being simple in assembly and having a low cost, the present disclosure can also facilitate adjustment of the size or position of the light transmissive region 413. Further, the first or second adhesive layer (423*b*, 433*b*) provided on the first or second light shielding sheet 422, 432 facing away from the first or second surface 411, 412 of the filter 41 can catch the fine dust generated in the interior space 51 or the receiving space 23 of the camera module whether during assembly of the camera module, during use of the camera module or other circumstances, so that the image sensor 3 can be prevented from being interfered by the fine dust which can affect the quality of image processing. Therefore, the object of this disclosure can be achieved.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, Fig., or description thereof for the purpose of streamlining the disclosure and aiding in the understanding of various inventive aspects.

While the disclosure has been described in connection with what are considered the most practical embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A filter assembly comprising:
   a filter defining a light transmissive region for light of a specific wavelength range to pass therethrough; and
   a non-light transmissive first sheet body preformed and adhered to a surface of said filter, said first sheet body including a first light shielding sheet having a first opening with a shape conforming with and surrounding said light transmissive region, a first adhesive layer disposed between said first light shielding sheet and said surface of said filter and thereby adhering a first surface of said first light shielding sheet to said surface of said filter, and a second adhesive layer disposed on an opposing second surface of said first light shielding sheet and being spaced away from said surface of said filter, said second adhesive layer surrounding said light transmissive region and having an exposed adhesive surface for collecting dust thereon.

2. The filter assembly as claimed in claim 1, wherein said first sheet body is an opaque double-sided adhesive tape.

3. The filter assembly as claimed in claim 1, further comprising a second sheet body adhered to another surface of said filter which is opposite to said surface thereof and having a second opening.

4. The filter assembly as claimed in claim 3, wherein a surface of said second sheet body facing away from said another surface of said filter has an exposed adhesive surface.

5. The filter assembly as claimed in claim 3, wherein said second sheet body is a double-sided adhesive tape.

6. A camera module comprising:
   a base;
   a carrier frame disposed on said base and including a surrounding wall extending upward from said base, and a top wall extending inward from a top periphery of said surrounding wall and defining an opening;
   said surrounding wall, said top wall and said base cooperating with each other to define a receiving space communicating with said opening;

an image sensor disposed on said base and received in said receiving space;

a filter assembly including a filter fixed to said top wall and covering said opening, said filter defining a light transmissive region for light of a specific wavelength range to pass therethrough; and a non-light transmissive first sheet body preformed and adhered to a surface of said filter, said first sheet body including a first light shielding sheet having a first opening with a shape conforming with and surrounding said light transmissive region, a first adhesive layer disposed between said first light shielding sheet and said surface of said filter and thereby adhering a first surface of said first light shielding sheet to said surface of said filter, and a second adhesive layer disposed on an opposing second surface of said first light shielding sheet and being spaced away from said surface of said filter, said second adhesive layer surrounding said light transmissive region and having an exposed adhesive surface for collecting dust thereon;

a hollow casing disposed on and supported by said top wall; and a lens received in an interior space of said hollow casing.

7. The camera module as claimed in claim 6, wherein said first sheet body is an opaque double-sided adhesive tape.

8. The camera module as claimed in claim 6, further comprising a second sheet body adhered to another surface of said filter which is opposite to said surface thereof and having a second opening.

9. The camera module as claimed in claim 8, wherein a surface of said second sheet body facing away from said another surface of said filter has an exposed adhesive surface.

10. The camera module as claimed in claim 8, wherein said second sheet body is a double-sided adhesive tape.

11. The camera module as claimed in claim 6, wherein said surface of said first sheet body spaced away from said filter is located in an interior of said camera module.

12. The filter assembly as claimed in claim 1, wherein said filter assembly is assembled in a camera module, and said surface of said first sheet body spaced away from said filter is located in an interior of the camera module.

* * * * *